US007423633B2

(12) United States Patent
Xie et al.

(10) Patent No.: US 7,423,633 B2
(45) Date of Patent: Sep. 9, 2008

(54) APPARATUS FOR CONTROLLING THE POSITION OF A SCREEN POINTER WITH LOW SENSITIVITY TO FIXED PATTERN NOISE

(75) Inventors: Tong Xie, San Jose, CA (US); Marshall Thomas Depue, San Jose, CA (US)

(73) Assignee: Avago Technologies EC Buip Pte Ltd, Singapore (SG)

( * ) Notice: Subject to any disclaimer, the term of this patent is extended or adjusted under 35 U.S.C. 154(b) by 465 days.

(21) Appl. No.: 10/931,577

(22) Filed: Sep. 1, 2004

(65) Prior Publication Data

US 2006/0044267 A1 Mar. 2, 2006

(51) Int. Cl.
*G09G 5/08* (2006.01)

(52) U.S. Cl. ....................... 345/166; 382/261; 382/272; 345/156; 345/163; 250/221

(58) Field of Classification Search ................. 348/624, 348/607; 382/261, 263, 260, 312, 162, 272, 382/275; 345/156, 157, 166, 163; 250/221, 250/548; 358/509
See application file for complete search history.

(56) References Cited

U.S. PATENT DOCUMENTS 4,794,384 A 12/1988 Jackson
5,578,813 A 11/1996 Allen et al.
5,644,139 A 7/1997 Allen et al.
5,786,804 A 7/1998 Gordon
5,867,228 A * 2/1999 Miki et al. .................. 348/624
6,281,882 B1 8/2001 Gordon et al.
6,297,513 B1 * 10/2001 Oliver et al. ................ 250/548
7,122,781 B2 * 10/2006 Rotzoll et al. ............... 250/221
7,212,685 B2 * 5/2007 Park et al. ................... 382/260
2002/0100921 A1 8/2002 Mabuchi et al.
2002/0180880 A1 12/2002 Bean et al.
2003/0001078 A1 1/2003 Baharav et al.
2003/0103037 A1 6/2003 Rotzoll
2003/0156303 A1 * 8/2003 Schnee et al. ............... 358/509
2004/0051798 A1 3/2004 Kakarala et al.

FOREIGN PATENT DOCUMENTS

EP 1 416 424 A2 5/2004
EP 1416424 A2 * 5/2004

OTHER PUBLICATIONS

Orazio Svelto article entitled “Properties of Laser Beams”, © 1998, 1989, 1982, 1976, pp. 9-10.
Bruce D. Lucas et al., article entitled “An Iterative Registration Technique with an application to Stereo Vision”, pp. 674-679, Aug. 24-28, 1981.

* cited by examiner

*Primary Examiner*—Amare Mengistu
*Assistant Examiner*—Jennifer Zubajlo

(57) ABSTRACT

An apparatus for controlling the position of a screen pointer includes an at least partially coherent light source for illuminating an imaging surface, thereby generating reflected images. The apparatus includes a navigation sensor for generating digital images based on the reflected images, performing a movement computation based on the digital images, generating movement data based on the movement computation that is indicative of relative motion between the imaging surface and the apparatus, wherein the movement computation includes attenuating fixed pattern noise in the digital images.

16 Claims, 5 Drawing Sheets

APPARATUS FOR CONTROLLING THE POSITION OF A SCREEN POINTER WITH LOW SENSITIVITY TO FIXED PATTERN NOISE

BACKGROUND

The use of a hand operated pointing device for use with a computer and its display has become almost universal. One form of the various types of pointing devices is the conventional (mechanical) mouse, used in conjunction with a cooperating mouse pad. Mechanical mice typically include a rubber-surfaced steel ball that rolls over the mouse pad as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse.

In addition to mechanical types of pointing devices, such as a conventional mechanical mouse, optical pointing devices have also been developed. In one form of an optical pointing device, relative movement between a navigation surface, such as a finger or a desktop, and an image sensor within the optical pointing device is optically sensed and converted into movement information. A light source illuminates the navigation surface which produces reflected images received by the image sensor for sensing the relative movement. Light sources can be non-coherent light sources or partially coherent lights sources.

Electronic image sensors, such as those typically used in optical pointing devices, are predominantly of two types: Charge Coupled Devices (CCDs) and Complimentary Metal Oxide Semiconductor—Active Pixel Sensors (CMOS—APS). Both types of sensors typically contain an array of photodetectors (e.g., pixels), arranged in a pattern. Each individual photodetector operates to output a signal with a magnitude that is proportional to the intensity of light incident on the site of the photodetector. These output signals can then be subsequently processed and manipulated to generate an image that includes a plurality of individual picture elements (pixels), wherein each pixel in the image corresponds with one of the photodetectors in the image sensor.

Tracking relative movement between the image sensor and the navigation surface is based on comparing these generated images over time using correlation algorithms. Changes in light intensity as measured at each pixel location for successive generated images during the ongoing motion reveal the quantity and direction of movement. Accordingly, as the image sensor moves over the navigation surface, these intensity modulations are constantly fluctuating and these varied intensity modulations provide the information to guide the pointer on the computer.

However, these optical pointing devices typically are sensitive to fixed pattern noise, which is an intensity modulation in a generated or captured image that does not change as the image sensor is moved. This fixed pattern noise, then does not result from the relative movement between navigation surface and the image sensor. Instead, fixed pattern noise results from defective pixels in the image sensor, particle contamination, and/or non-uniformities in the light sources. This fixed pattern noise interferes with determining movement of the image sensor relative to the navigation surface since this portion of the generated images does not change over time. Accordingly, highly accurate tracking of this relative movement requires eliminating or compensating for this fixed pattern noise.

Digital image sensors can be one source of fixed pattern noise, as digital image sensors often contain a few defective pixels from fabrication errors, such as impurity contamination like a defect in silicon. Defective pixels respond inappropriately to the incident light, and therefore produce inaccurate sensor values observed as fixed pattern noise in the captured image. Defective pixels are predominantly of three types: stuck high, stuck low, or abnormal sensitivity. A stuck high pixel has a very high or near to full scale output, while a stuck low pixel has a very low or near to zero output. An abnormal sensitivity pixel produces a sensor value different from neighboring pixels by more than a certain amount when exposed to the same light conditions. If the image sensor of an optical pointing device contains defective pixels, such as stuck high or stuck low pixels, the values from these pixels may never change, which biases the navigation computation and can cause errors. The values from abnormal sensitivity pixels may change, but such pixels do not perform as expected and can also cause errors.

Other conditions arising after the manufacturing process and during use by a customer can also cause some pixels to sometimes act like defective pixels, thereby producing fixed pattern noise. External particle contamination, such as dust or dirt, fibers, etc., can land on the array, blocking some pixels of the photoarray causing them to act as defective pixels. Dust or dirt can also land on the illumination source or focusing optics, causing non-uniformities in illumination of the navigation surface, which ultimately leads to pixels in the generated image to act like defective pixels. Finally, optical pointing devices including coherent light sources are more susceptible to errors from fixed pattern noise than optical pointing devices having non-coherent light sources.

In addition, non-uniformities in the light source itself, independent of particle contamination, can also cause some pixels of the photodetector array to appear too "dark", thereby acting as defective pixels and producing fixed pattern noise. This situation can produce special constraints on the type of laser used and it's packaging in order to achieve relatively clean Gaussian beams. Special packaging cans and high performance laser sources, in turn, increase the cost of the optical pointing devices. Even with these higher cost light sources, these optical pointing device may still be sensitive to defective pixels in the image sensor and/or particle contamination.

For these reasons, fixed pattern noise in optical navigation continues to pose challenges.

SUMMARY

One form of the present invention provides an apparatus for controlling the position of a screen pointer. The apparatus includes a light source for illuminating an imaging surface, thereby generating reflected images. The apparatus includes a navigation sensor for generating digital images based on the reflected images, performing a movement computation based on the digital images, generating movement data based on the movement computation that is indicative of relative motion between the imaging surface and the apparatus, wherein the movement computation includes attenuating fixed pattern noise in the digital images.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As mentioned above in the Background, fixed pattern noise due to particle contamination, non-uniformities in light sources, and manufacturing defects, can adversely affect the performance of optical pointing devices, particularly those that use coherent illumination. It is difficult to completely eliminate fixed pattern noise in these optical pointing devices.

Thus, one form of the present invention provides a compensation mechanism to cope with fixed pattern noise. In one embodiment, compensation is included in the digital processing of images, which is performed by a navigation processor after the images are acquired. In one form of the invention, the digital processing or computations performed by the navigation processor have a low sensitivity (i.e., high tolerance) to image effects in the acquired digital images. Accordingly, one form of the invention provides a method for attenuating fixed pattern noise by isolating or filtering the fixed pattern noise from the digital images captured by an optical pointing device.

While the compensation mechanism is particularly effective for coherent illumination or partially coherent illumination, it can also be employed to attenuate fixed pattern noise in optical pointing devices that use non-coherent light sources. Non-coherent optical pointing devices also suffer degraded performance due to the same sources of fixed pattern noise, although less pronounced than optical pointing devices using coherent light sources. Accordingly, the compensation mechanism of the present invention is not limited solely to coherent light sources.

Figure 1:
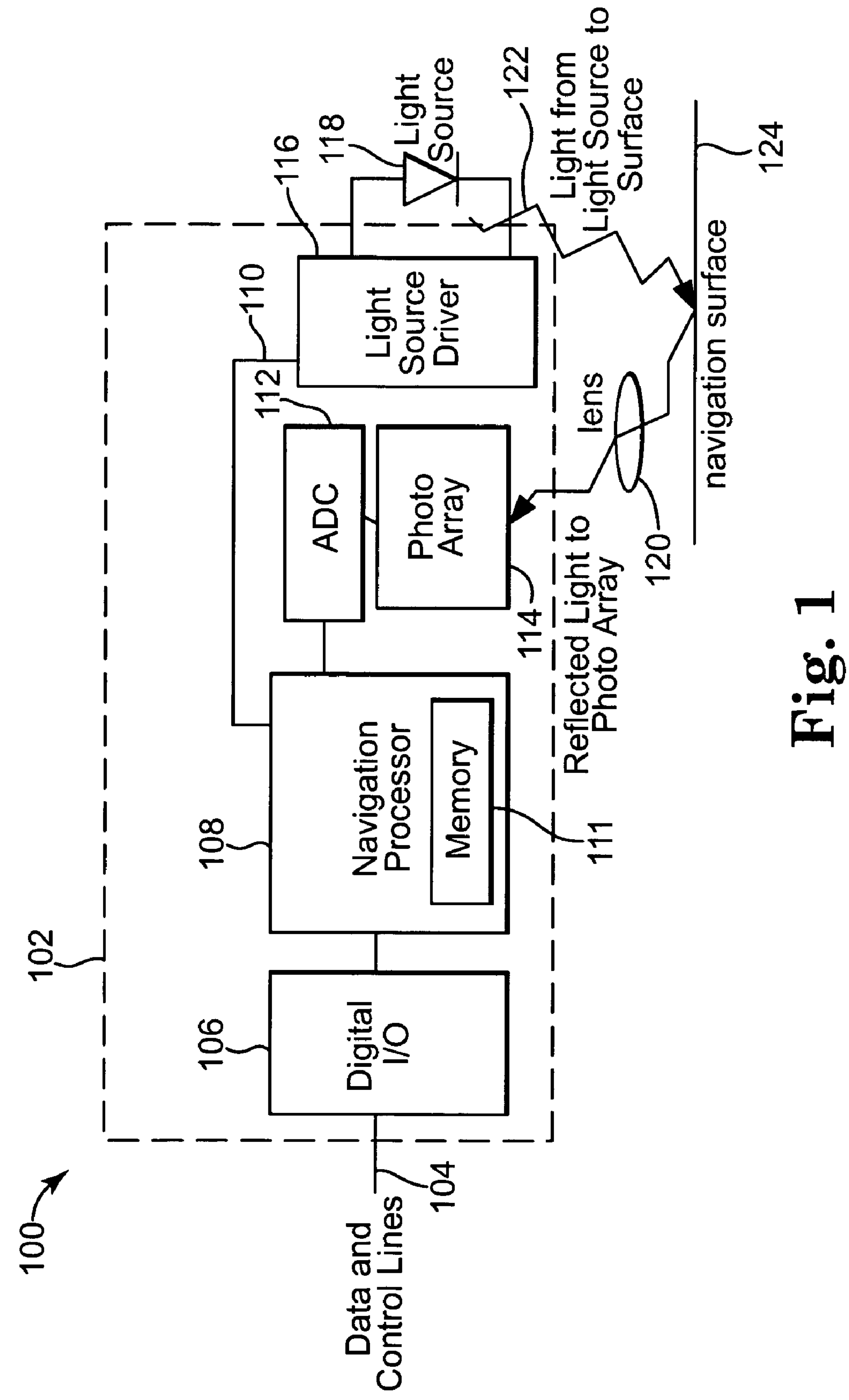
FIG. 1 is a block diagram illustrating major components of an optical pointing device, according to one embodiment of the present invention.

FIG. 1 is a block diagram illustrating major components of an optical pointing device 100 according to one embodiment of the present invention. Optical pointing device 100 includes optical navigation sensor integrated circuit (IC) 102, light source 118, and lens 120. Optical navigation sensor 102 includes digital input/output circuitry 106, navigation processor 108, analog to digital converter (ADC) 112, photodetector array (photo array) 114, and light source driver circuit 116. In one embodiment, optical pointing device 100 is an optical mouse for a desktop personal computer, workstation, portable computer, or other device. In another embodiment, optical pointing device 100 is configured as an optical fingerprint sensing pointing device, or other pointing device.

In operation, according to one embodiment, light source 118 emits light 122 onto navigation surface 124, which is a desktop or other suitable imaging surface, and reflected images are generated. In one embodiment, light source 118 is a coherent light source or an at least partially coherent light source. In one embodiment, light source 118 is a laser. In one form of the invention, light source 118 is a vertical cavity surface emitting laser (VCSEL) diode. In another form of the invention, light source 118 is an edge emitting laser diode. In other embodiments, light source 118 is a non-coherent light source, such as a light emitting diode (LED) light source.

In one form of the invention, light source 118 comprises a single mode or multi-mode laser, and can be housed in a variety of packaging cans, with or without a protective glass cover. In particular, because of the ability of embodiments of the present invention to minimize the effects of fixed pattern noise, stringent design and testing constraints (e.g., noise band limits) conventionally associated with coherent illumination sources can be relaxed. Accordingly, cheaper light source package cans such as those typically used with LED light sources can be used with laser light sources, and even cheaper laser light sources, such as multimode diodes can be substituted for more expensive single mode diodes.

Light source 118 is controlled by driver circuit 116, which is controlled by navigation processor 108 via control line 110. In one embodiment, control line 110 is used by navigation processor 108 to cause driver circuit 116 to be powered on and off, and correspondingly cause light source 118 to be powered on and off.

Reflected light from surface 124 is directed by lens 120 onto photodetector array 114. Each photodetector (referred to as pixels) in photodetector array 114 provides a signal that varies in magnitude based upon the intensity of light incident on the photodetector. The signals from photodetector array 114 are output to analog to digital converter 112, which converts the signals into digital values of a suitable resolution (e.g., eight bits). The digital values represent a digital image or digital representation of the portion of the desktop or other navigation surface under optical pointing device 100. The digital values generated by analog to digital converter 112 are output to navigation processor 108. The digital values received by navigation processor 108 are stored as frames within memory 111.

The overall size of photodetector array 114 is preferably large enough to receive an image having several features. Images of such spatial features produce translated patterns of pixel information as optical pointing device 100 moves over navigation surface 124. The number of photodetectors in array 114 and the frame rate at which their contents are captured and digitized cooperate to influence how fast optical pointing device 100 can be moved across a surface and still be tracked. Tracking is accomplished by navigation processor 108 by comparing a newly captured sample frame with a previously captured reference frame to ascertain the direction and amount of movement. This tracking, via image comparison, can be performed using known pattern recognition methods, cross-correlation methods, or other known image comparison methods for computing movement data of images.

In one embodiment, navigation processor 108 performs a cross-correlation of sequential frames to determine motion information. In one form of the invention, the entire content of one of the frames is shifted by navigation processor 108 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by navigation processor 108 on a pixel by pixel basis, and the resulting differences are preferably squared and then summed to form a measure of similarity (correlation) within that region of overlap. In another embodiment, larger trial shifts (e.g., two over and one down) may be used. The trial shift with the least difference (greatest correlation) can be taken as an indication of the motion between the two frames. That is, it provides raw movement information that may be scaled and or accumulated to provide movement information (ΔX and AY) of a convenient granularity and at a suitable rate of information exchange, which is output to a host device by digital input/output circuitry 106 on data and control lines 104. Optical pointing device 100 is also configured to receive data and control signals from a host device via data and control lines 104.

In one form of the invention, the pixel shifting method described can be performed using multiple pixel offset shifts.

In one form of the invention, rather than performing an image comparison of successive unaltered digital images to determine movement information as described above, navigation processor 108 is configured to perform image comparisons for movement computations based on successive modified digital images to attenuate fixed noise patterns in the acquired digital images, such as dust or from other sources.

Sources of fixed pattern noise cause pixels in the digital images captured by device 100 to have inappropriate pixel values, which vary little over time. Hence, the pixels affected by the particle contamination are referred to herein as defective pixels or fixed-noise pixels. In addition to particle contamination, fixed-noise pixels can also be caused by other problems, such as silicon defects in the photoarray. A fixed-noise pixel is defined to include an aberrant or inoperative pixel, such as a pixel that exhibits only an "ON" or an "OFF" state, a pixel that produces less intensity or more intensity than desired, or a pixel with inconsistent or random operation. Regardless of the source of the defects, these pixels form a generally consistent pattern of noise in the captured digital images, referred to as a fixed noise pattern.

One form of the present invention provides a method for generating movement data that has a low sensitivity to fixed-noise pixels in general, regardless of the cause of the defects. Noise-attenuating displacement calculations that are performed by navigation processor 108 according to various embodiments of the present invention are described below with reference to FIGS. 2-7.

Figure 2:
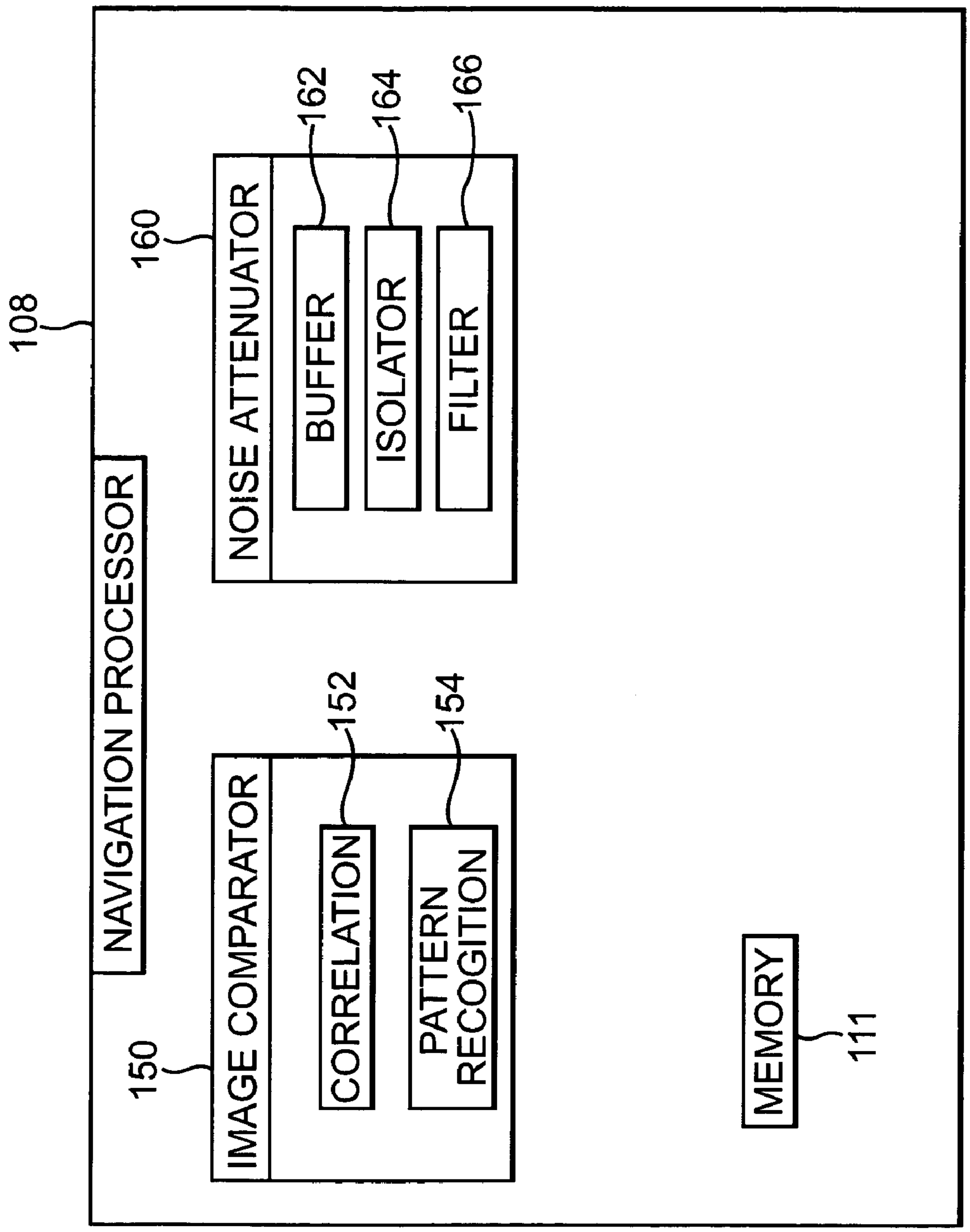
FIG. 2 is a block diagram illustrating additional components of an optical pointing device, according to one embodiment of the present invention.

FIG. 2 is a block diagram illustrating major components of navigation processor 108, according to one embodiment of the present invention. In one form of the invention, navigation processor 108 comprises memory 111, as well as image comparator 150 and noise attenuator 160. In one form of the invention, image comparator 150 comprises correlation module 152 and in another form of the invention, image comparator 150 comprises pattern recognition module 154. Noise attenuator 160 comprises image buffer 162 and also comprises fixed-noise isolator 164 and/or fixed-noise filter 166.

Image comparator 150 uses successive digital images obtained from analog to digital converter 112 and compares them to determine a quantity and direction of motion. Correlation module 152 of image comparator 150 performs a cross-correlation comparison of the successive digital images to make the movement computation while pattern recognition module 154 compares patterns within the successive digital images to make the movement computation.

Noise attenuator 160 acts to store copies of digital images (e.g. a sample image and a reference image) in its image buffer 162 for use in identifying and attenuating fixed pattern noise prior to computing movement data in image comparator 150. In particular, when motion occurs, copies of the digital images are stored in the image buffer 162 and then periodically (e.g. every 50, 100, 150, 200, or more frames), a composite image is constructed by averaging the stored images on a pixel-by-pixel basis to reveal a pattern of fixed noise. Noise attenuator 160 then uses this pattern of fixed pattern noise to modify the digital images prior to computing movement data, thereby compensating for the fixed pattern noise while accurately generating movement information for the optical pointing device.

In one form of the invention, fixed-noise isolator 164 of noise attenuator 160 acts to attenuate fixed noise patterns by isolating or excluding the fixed noise pixels from other variable-noise or low-noise portions of the digital images. In another form of the invention, fixed-noise filter 166 of noise attenuator 160 acts to attenuate fixed-noise patterns by modifying the digital images (e.g., sample and reference images to be compared) on a pixel-by-pixel basis via a logic operation to reduce the intensity of each pixel value by an amount corresponding to the intensity of the fixed pattern noise. Noise attenuator 160, including image buffer 162, fixed-noise isolator 164 and fixed-noise filter 166 will be described in more detail in association with embodiments of the present invention including methods for generating movement data, as shown in FIGS. 3-7.

While noise attenuator 160 is shown in FIG. 1 as part of navigation processor 108, in another form of the invention, noise attenuator 160 can comprise a separate module disposed external to navigation processor 108. In this arrangement, noise attenuator 160 is located between analog-to-digital converter 112 and navigation processor 108 so that noise attenuator 160 acts on digital images from analog-to-digital converter 112 prior to their entry into navigation processor for image comparison and related processing.

Figure 3:
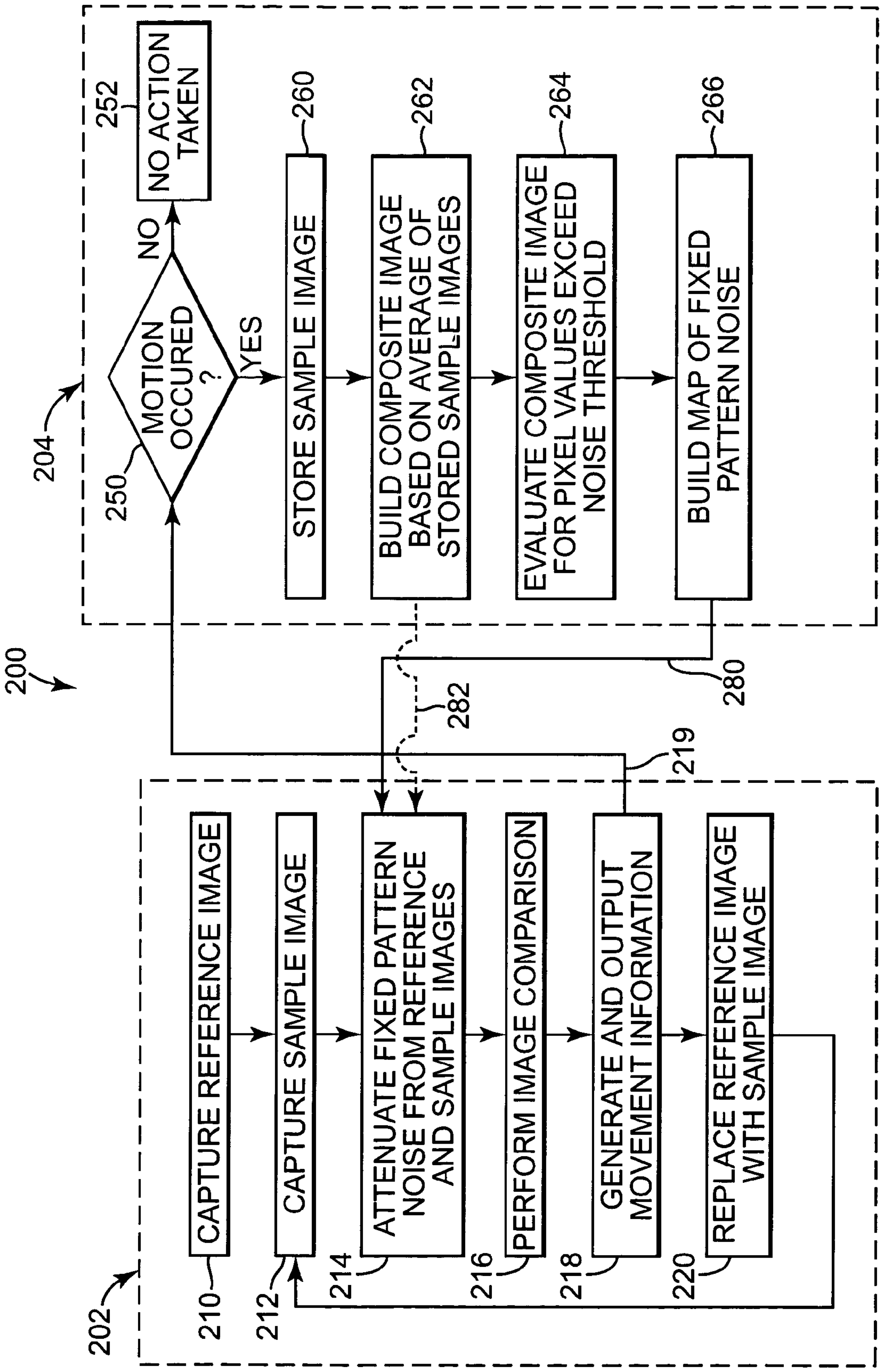
FIG. 3 is a flow diagram illustrating a method for generating movement data with an optical pointing device, according to one embodiment of the present invention.

FIG. 3 is a flow diagram illustrating a method 200 for generating movement data, according to one embodiment of the present invention. In one embodiment, method 200 is performed using optical pointing device 100 while in another embodiment, method 200 is performed using other devices for generating movement data. Method 200 includes first portion 202 and second portion 204, which represent different but related aspects of generating movement data. First portion 202 and second portion 204 operate generally simultaneously in parallel to each other with periodic interactions. In particular, first portion 202 of method 200 generally represents generating movement information by repeating a sequence of acquiring a reference image and a sample image and then comparing them to determine the movement information. Second portion 204 of method 200 generally represents storing the sample images (acquired in first portion 202 of method 200) when motion occurs, and then building a composite frame of a large number of stored sample images to identify persistent fixed noise in the sample images and then attenuate that fixed noise from each reference image and sample image that are compared in first portion 202 of method 200. Accordingly, first portion 202 supplies images to second portion 204 to enable second portion 204 to later act as a feedback mechanism to first portion 202 to attenuate fixed noise from computations performed in first portion 202.

First portion 202 of method 200 comprises, at box 210, acquiring a reference image via photo array 114 and, at box 212, acquiring a sample image via photo array 114. The acquired images are converted into digital images by analog to digital converter 112, and the digital images are output to navigation processor 108. At 214, navigation processor 108 optionally attenuates fixed pattern noise from the digital sample and reference images. In other words, navigation processor 108 retains control over when and how often information from second portion 204 of method 200 is used to mitigate fixed noise as part of the movement computation. Accordingly, corrections in sample and reference images for fixed noise patterns can be performed continuously, or at times or intervals selected by navigation processor 108.

At 216 in FIG. 3, navigation processor 108 performs an image comparison, via image comparator 150, on the reference image and the sample image, and determines a magnitude and direction of movement based on the comparison. The image comparison can be performed via navigation processor 108 using either correlation module 152 or pattern recognition module 154, or other image comparison techniques.

At 218 in FIG. 3, navigation processor 108 generates movement information based on the image comparison performed in step 216, and outputs the movement information to a host device via digital input/output circuitry 106. In addition, this movement information and a copy of sample image (acquired at 212), is output via output pathway 219 to decision box 250 of second portion 204 of method 200.

At 220 of method 200, the reference image is replaced by the sample image, which then becomes the reference image for the next iteration of method 200. Another sample image is then acquired at 212, and the method 200 is repeated from beginning at 214 or 216. Any desired number of iterations of method 200 may be performed.

Second portion 204 of method 200 uses a plurality of stored samples images to provide the compensating mechanism to attenuate fixed pattern noise from the reference and sample images (at 214) prior to the image comparison at 216 in first portion 202 of method 200. In particular, as shown in FIG. 3 at 250, the movement information output from 218 via output pathway 219 is evaluated to determine if motion has occurred. Motion that comprises at least one half pixel of motion is considered motion for these purposes. If motion of the image sensor relative to a navigation surface has not occurred, then no further action is taken along the pathway in second portion 204.

If motion has occurred, then at 260 of FIG. 3, the pathway in second portion 204 is completed including a first action of storing in image buffer 162 a copy of the most recent sample image from first portion 202 of method 200. Of course, each and every time motion occurs, the most recent sample image is stored in image buffer 162.

At 262 of method 200, all of the sample images in image buffer 162 are periodically combined and built into a composite image that comprises an average value for each pixel of the stored images with the average intensity value computed on a pixel-by-pixel basis for the images. In one embodiment, about 100 hundred stored sample images are used for building the composite image. In one form of the invention, as each sample image is stored in image buffer 162 the sample image is averaged with previously stored sample images on a pixel-by-pixel basis. In this way, each new sample image is immediately integrated into a running composite of sample images produced from images already stored in image buffer 162. The number of images used in building the composite image can vary (e.g., 50, 100, 150, 200, or more) and is selected to be commensurate with a number of frames large enough to detect characteristic image effects of fixed pattern noise. The number of frames used to build the composite image can be selected to vary (either a higher or lower number) in response the frequency that unique fixed noise patterns occur and/or the volume/size of the fixed noise patterns observed in use of the optical pointing devices, as well as other factors.

In another form of the invention at 262, each sample image is stored in image buffer 162 and collected, and then only after the storage of a plurality of frames, these sample images are averaged into a single composite image. The number of images used in this composite image is selected as previously described.

At 264 of method 200, the composite image is evaluated to identify pixel locations having intensity values that exceed predefined noise thresholds. These pixel locations are deemed to be fixed noise pixels, i.e. pixels with persistent noise levels high enough to disrupt accurate generation of movement data. The pre-defined noise thresholds are determined by the amount of noise that image comparator 150 can tolerate. This noise threshold also relates to performance characteristics of the analog-to-digital converter 112 and conventional image filtering settings in navigation processor 108.

Building a composite image based on an average of a large number of frames (i.e., sample images) enhances the contrast between fixed noise pixels and variable noise pixels since noise which varies from frame to frame yields a relatively low intensity value when averaged together on a pixel-by-pixel basis while noise which stays generally in the same location from frame to frame yields a relatively high intensity value when averaged together on a pixel-by-pixel basis. In other words, high-noise pixels that persist in the same location over many frames show up much brighter in the composite image than other noisy pixels that vary in location or in intensity over many frames. This feature eases the ability to identify and therefore limit errors in movement information caused by fixed pattern noise.

In one form of the invention, detection of any fixed noise pixels or of a fixed-noise pattern can be conveyed to a user via navigation sensor 102 in the form of an alert to perform maintenance on optical pointing device 100 by cleaning or other actions to ameliorate the detected fixed noise.

At 266, a map of fixed pattern noise is built from the composite image that corresponds on a pixel-by pixel basis with the pixels of the sample and reference images. In one form of the invention, this mapped information of fixed noise is output, via output pathway 280, to first portion 202 of method 200 at 214 where this map of fixed pattern noise is used to attenuate the sample and reference images to reduce their sensitivity to fixed pattern noise prior to an image comparison for movement computation at 216.

In another form of the embodiment, after building a composite image at 262, this composite image is immediately output, via output pathway 282, to first portion 202 of method 200 at 214 for use in attenuating fixed pattern noise from the sample and reference images prior to image comparison for movement computation at 216.

Accordingly, method 200 within first portion 202 is continually performed to generate movement operation for general operation of the optical pointing device while second portion 204 of method 200 is performed in parallel, with ongoing interaction between first portion 202 and second portion 204. In particular, at each iteration of first portion 202, information is passed to second portion 204 (via output pathway 219) in the form of a copy of the most recent sample information and movement information. In addition, information such as a composite image (generated at 262) or a fixed noise map (generated at 266) is passed back to first portion 202 via output pathways 282 or 280, respectively.

Figure 4:
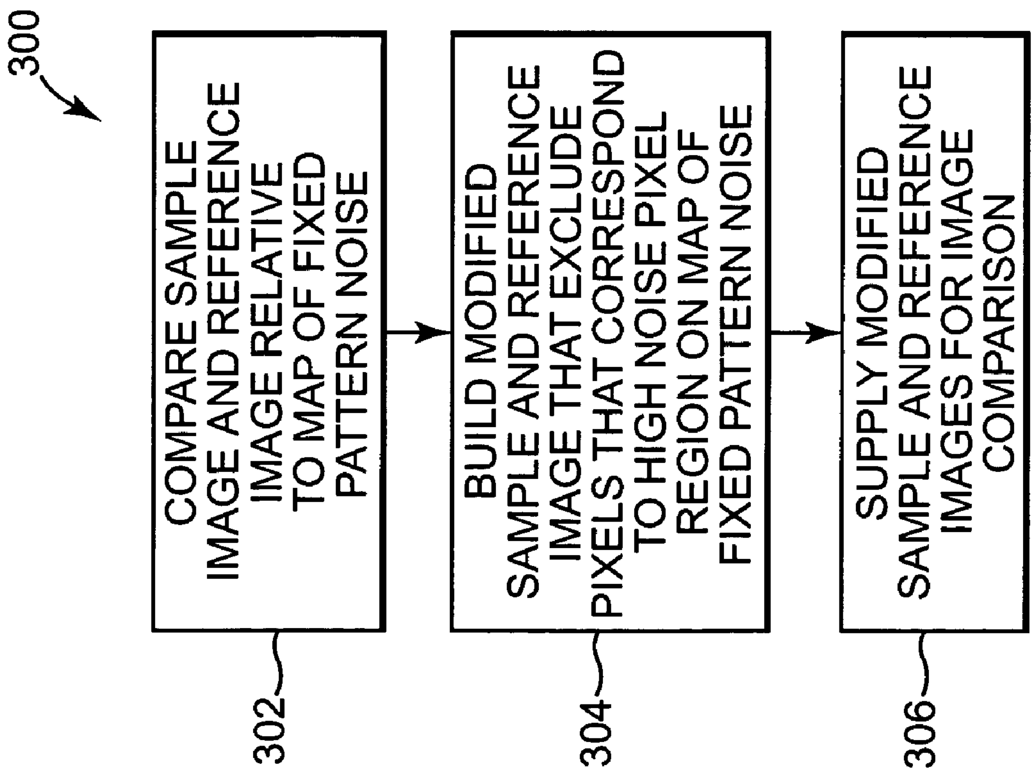
FIG. 4 is a flow diagram illustrating a method for generating movement data that isolates fixed pattern noise from digital images, according to one embodiment of the present invention.

FIG. 4 is a flow diagram illustrating a method 300 for attenuating fixed pattern noise with optical pointing device 100 as would be performed as part of method 200 at 214 (FIG. 3). At 302, the sample image and reference images are compared with a map of fixed pattern noise (acquired from second portion 204 at 266 of method 200) to identify pixel locations in sample and reference images that correspond to the locations of high noise pixels in the fixed noise map. At 304, modified sample and references images are built by excluding those pixels of the sample and reference images that correspond to high-noise pixels on the map of fixed noise patterns. At 306, the modified sample and references images are supplied for relative comparison with each other to generate movement data. When navigation sensor 102 is used to perform method 300, this image comparison is performed by image comparator 150 of navigation processor 108. Movement data based on comparison of the modified sample and reference images yields movement information that is relatively free of fixed pattern noise by isolating the fixed pattern noise from remaining portions of the digital images so that the movement computations are performed only on pixels carrying movement information devoid of fixed pattern noise.

Figure 5:
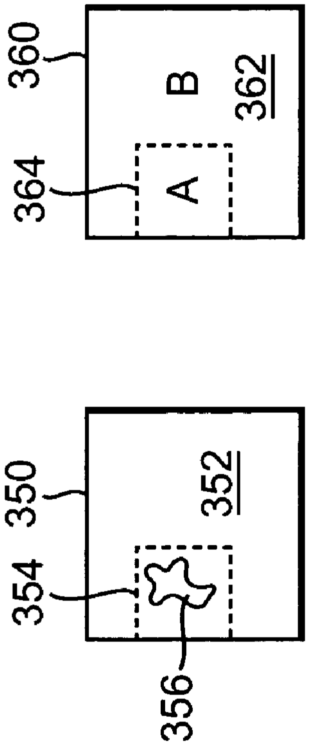
FIG. 5 is a diagram illustrating a map of fixed pattern noise in association with a method of generating movement data, according to one embodiment of the present invention.

FIG. 5 is a diagram graphically illustrating a map of fixed pattern noise and modified digital images, used in method 300 of FIG. 4, to isolate persistent high-noise pixels from variable-noise pixels or low-noise pixels in performing movement computations. Method 300 can be performed by isolator module 164 of noise attenuator 160 of navigation processor 108 (See FIG. 2), or other suitable modules. Map 350 comprises fixed-noise pixels 356, normal pixel area 352 and fixed noise pattern region 354. As used in method 300, the size and shape of region 354 is selected to encompass fixed-noise pixels 356 for isolating them from portion 352 which encompasses variable-noise pixels and/or low-noise pixels. Region 354 of the fixed-noise map is then used as a guide to exclude pixels in region 364 of sample or reference images 360 (pixels whose location that corresponds to region 354) from remaining pixel portion 362, and thereby excludes those fixed-noise pixels from the image comparison for generating movement information.

Figure 6:
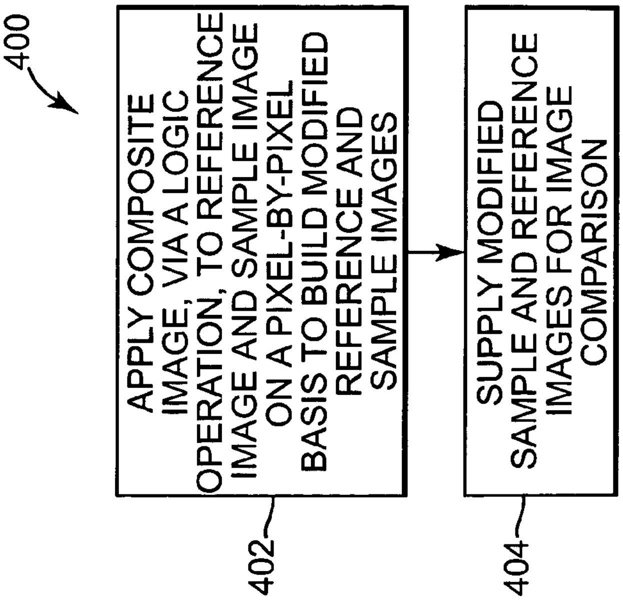
FIG. 6 is a flow diagram illustrating a method for generating movement data that filters fixed pattern noise in digital images, according to one embodiment of the present invention.

FIG. 6 is a flow diagram illustrating a method 400 for generating movement data with the optical pointing device 100 shown in FIG. 1 as would be performed as part of method 200 at 214 (FIG. 3). Method 400 can be performed by filter module 166 of noise attenuator 160 of navigation processor 108 (FIG. 2), or other suitable systems. In method 440, at 402 the composite image (generated at 262 in method 200 in FIG. 3) is applied, via a logic operator, to adjust each of the pixel values for a reference image and a sample image on pixel-by-pixel basis to build modified sample and reference images. The logic operator comprises any one or more of logic operations (e.g. subtractor, multiplier, divisor, adder), that apply the pixel values of the composite image to the pixel values of the sample and reference images, on a pixel-by-pixel basis to attenuate fixed pattern noise in the sample and reference images. This operation effectively filters out the persistent high-noise pixels, i.e., fixed noise pixels, from the sample and reference images.

After this filtering, at 404 of method 400, the modified sample and reference images are supplied for relative comparison with each other to generate movement data. When navigation sensor 102 is used to perform method 300, this image comparison is performed by image comparator 150 of navigation processor 108. Movement data based on comparison of the modified sample and reference images yields movement information that is relatively free of fixed pattern noise by filtering any amount of fixed pattern noise from each pixel of the digital images, on a pixel-by-pixel basis. Finally, using this filtering method 400, fixed noise can be attenuated without building a map of fixed noise patterns, as occurs in method 300 (FIGS. 4 and 5) or at 264, 266 of second portion 204 of method 200 (FIG. 3).

Figure 7:
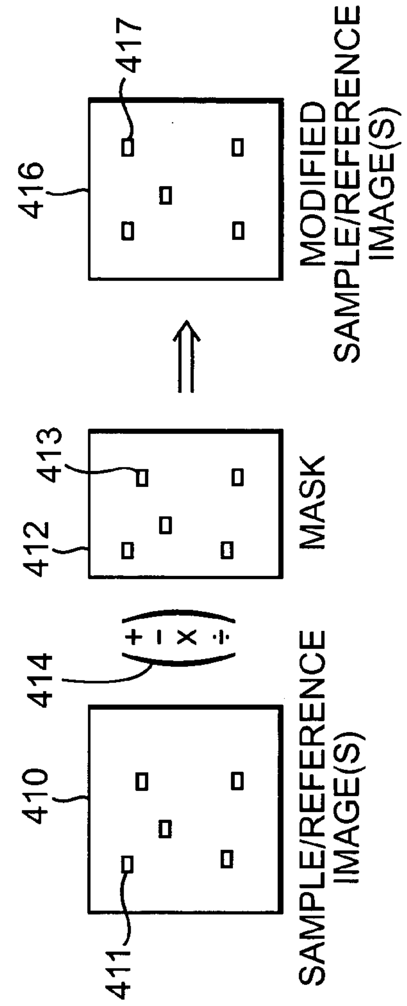
FIG. 7 is a diagram illustrating filtering of fixed pattern noise in association with a method for generating movement data, according to one embodiment of the present invention.

FIG. 7 is a diagram illustrating aspects of operation of method 400 of FIG. 6. As shown in FIG. 7, sample image and reference image 410 includes pixels 411 and fixed noise mask 412 includes pixels 413 that correspond in position to pixels 411 of images 410. Logic operation 414 (e.g. subtractor, divisor, multiplier, adder) applies values of pixels 413 of composite mask 412 to pixels 411 of sample/reference images 410 to yield modified sample and reference images 416 having pixels 417 that have been filtered for fixed-pattern noise.

Embodiments of the present invention enable ongoing use of optical pointing devices even in the presence of fixed noise patterns, resulting from different sources, by using stored sample images as a guide to identify high-noise pixels that persist over time and either isolating them from movement computations or filtering them out of the sample and reference images. These embodiments are effective for either non-coherent illumination or coherent illumination. In addition, detection of fixed-noise patterns or fixed-noise pixels can be used to alert a user that device maintenance in the form of cleaning or other actions is required.

It will be understood by a person of ordinary skill in the art that functions performed by optical pointing devices 100 and 500, including navigation processor 108, and its image comparator 150 and/or noise attenuator 160, may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An apparatus for controlling the position of a screen pointer, the apparatus comprising:

a light source configured to illuminate an imaging surface to thereby generate reflected images; and a navigation sensor configured to generate digital images based on the reflected images to perform a movement computation based on the digital images, and to generate movement data based on the movement computation that is indicative of relative motion between the imaging surface and the apparatus, wherein the movement computation includes attenuating fixed pattern noise in the digital images;

wherein the navigation sensor includes a processor including a noise attenuator, wherein the noise attenuator comprises an image buffer and at least one of a noise isolator and a noise filter, wherein the image buffer is configured to store digital images upon motion of the navigation sensor relative to the imaging surface and wherein the noise attenuator builds a composite image from a plurality of images stored in the image buffer in which intensity values of the images are averaged on a pixel-by-pixel basis to produce the composite image.

2. The apparatus of claim 1, wherein the processor includes an image comparator.

3. The apparatus of claim 2 , wherein the image comparator comprises at least one of a pattern recognition module and a cross-correlation module, each configured to compare digital images to perform the movement computation.

4. The apparatus of claim 1 , wherein the noise filter of the noise attenuator is configured to attenuate fixed pattern noise from the digital images by applying, via a logic operation, an average pixel value of the composite image to each digital image on a pixel-by-pixel basis.

5. The apparatus of claim 1, wherein the noise attenuator is configured to identify pixel locations in the composite image that have a local contrast value greater than a pre-defined contrast threshold as high-noise pixels.

6. The apparatus of claim 5, wherein the noise attenuator is configured to build a map of high-noise pixels to identify regions of fixed pattern noises.

7. The apparatus of claim 6, wherein the noise isolator of the noise attenuator excludes from the digital images pixels corresponding to pixel locations in the region of fixed pattern noise, prior to movement computation.

8. The apparatus of claim 1, wherein performing the movement computation in the navigation sensor comprises substantially continuously performing the movement computation based on the digital images while periodically applying a fixed-noise attenuation mask to the digital images prior to the comparison of successive digital images in the movement computation.

9. The apparatus of claim 8, wherein the fixed-noise attenuation mask is generated in response to the composite image.

10. The apparatus of claim 1, wherein the light source comprises an at least partially coherent light source.

11. The apparatus of claim 1, wherein the light source comprises a non-coherent light source.

12. A method of generating movement data with an optical pointing device, the method comprising:

illuminating an imaging surface with an at least partially coherent light source, thereby generating reflected images;

generating digital images based on the reflected images;

building a composite image by storing a plurality of digital images in memory and then calculating, from the plurality of stored digital images, an average intensity value for each pixel of the digital images on a pixel-by-pixel basis; and generating movement data based on the digital images including performing movement calculations that attenuate fixed pattern noise in the digital images;

wherein performing movement calculations comprises enhancing a contrast between persistent high-noise pixels and variable-noise pixels to build a map of fixed pattern noise based on the distribution of persistent high-noise pixels and variable-noise pixels as indicated by the composite image.

13. The method of claim 12, wherein performing the movement calculations includes excluding from the movement calculations pixel locations in the digital images that correspond to pixel locations of the persistent high-noise pixels.

14. The method of claim 12, wherein performing the movement calculations includes filtering the pixel values of the digital images in the movement calculations by application of the pixel values of the composite image, via a logic operation, to the digital images on a pixel-by-pixel basis.

15. The method of claim 12, wherein generating movement data comprises continuously performing the movement calculations while periodically applying to the digital images, prior to each movement calculation, a fixed-noise attenuation mask of pixel values computed from the composite image.

16. A navigation sensor for generating movement data to control the position of a screen pointer, the navigation sensor comprising:

a sensor array configured to sense reflected images from an imaging surface produced by a light source;

an analog to digital converter configured to generate digital images based on outputs of the sensor array; and a processor configured to generate movement data based on the digital images, wherein the movement data is generated based on movement calculations that have a low sensitivity to effects in the digital images caused by fixed pattern noise;

wherein the processor includes a noise attenuator comprising an image buffer and at least one of a noise isolator and a noise filter, wherein the image buffer is configured to store digital images upon motion of the navigation sensor relative to the imaging surface and wherein the noise attenuator builds a composite image from a plurality of images stored in the image buffer in which intensity values of the images are averaged on a pixel-by-pixel basis to produce the composite image.

* * * * *